US011303129B2

(12) United States Patent
Ma et al.

(10) Patent No.: US 11,303,129 B2
(45) Date of Patent: Apr. 12, 2022

(54) COMMUTATION FAILURE PREDICTION METHOD, DEVICE AND STORAGE MEDIUM BASED ON ENERGY ACCUMULATION FEATURES OF INVERTER

(71) Applicant: NORTH CHINA ELECTRIC POWER UNIVERSITY, Beijing (CN)

(72) Inventors: Jing Ma, Beijing (CN); Yufeng Zhao, Beijing (CN); Yuchong Wu, Beijing (CN); Ruifeng Wang, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 17/372,418

(22) Filed: Jul. 10, 2021

(65) Prior Publication Data
US 2022/0021214 A1    Jan. 20, 2022

(30) Foreign Application Priority Data

Jul. 15, 2020  (CN) .......................... 202010682688.1

(51) Int. Cl.
*H02J 3/36*         (2006.01)
*H02J 3/00*         (2006.01)

(52) U.S. Cl.
CPC ................ *H02J 3/36* (2013.01); *H02J 3/001* (2020.01)

(58) Field of Classification Search
CPC ..................................... H02J 3/36; H02J 3/001
See application file for complete search history.

(56) References Cited

U.S. PATENT DOCUMENTS 4,775,924 A * 10/1988 Sweezy ................... H02J 3/36
                                                        363/51
2017/0045589 A1* 2/2017 Hernandez Manchola ................
                                                        H02M 1/32

FOREIGN PATENT DOCUMENTS

CN      106451517 A  *  2/2017
JP      H08256479 A  * 10/1996    ............ H02J 3/1807

OTHER PUBLICATIONS

Ivarsson, J. (2011). Improvement of Commutation Failure Prediction in HVDC Classic Links (Dissertation). Retrieved from http://urn.kb.se/resolve?urn=urn:nbn:se:hv:diva-3257 (Year: 2011).*

(Continued)

*Primary Examiner* — Daniel Cavallari
(74) *Attorney, Agent, or Firm* — Analects Legal LLC

(57) ABSTRACT

The disclosure discloses a commutation failure prediction method, device and storage medium based on energy accumulation features of inverter. The method includes the following steps: collecting instantaneous values of three-phase valve side current and calculating the derivatives of the three-phase valve side current according to the instantaneous values of three-phase valve side current; the derivative includes positive, negative and zero states; according to the derivatives of the three-phase valve side current, determining the locations of incoming valve and ongoing valve; based on the valve side current of the incoming valve and ongoing valve, calculating energy accumulation features of the 12-pulse inverter; predicting whether the commutation failure from the incoming valve to the ongoing valve will happen according to the states of the derivatives of the three-phase valve side current and the energy accumulation features of the 12-pulse inverter.

15 Claims, 9 Drawing Sheets

(56) References Cited

OTHER PUBLICATIONS

Zeng et al. (2020) A Commutation Failure Prediction Criterion Based on Feasible Region Theory. In: Xue et al. (eds) Proceedings of Purple Mountain Forum 2019—International Forum on Smart Grid Protection and Control. Lecture Notes in Electrical Engineering, vol. 584. Springer, Singapore, pp. 277-285. (Year: 2020).*
H. Xiao, et al., "Single-end time-domain transient electrical signals based protection principle and its efficient setting calculation method for LCC-HVDC lines," IET Gener. Transmiss. Distrib., vol. 11, No. 5, pp. 1233-1242, May 2017.
J. Wu, et al., "An improved traveling-wave protection scheme for LCC-HVDC transmission lines," IEEE Trans. Power Del., vol. 32, No. 1, pp. 106-116, Feb. 2017.
Y. Xue and X. P. Zhang, "Reactive power and ac voltage control of LCC HVDC system with controllable capacitors," IEEE Trans. Power Syst., vol. 32, No. 1, pp. 753-764, Jan. 2017.
Ho-Ik Son, Hak-Man Kim. "An Algorithm for Effective Mitigation of Commutation Failure in High Voltage Direct Current Systems," IEEE Trans. Power Del., vol. 31, No. 4, pp. 1437-1446, Aug. 2016.
L.Yong, et al., "Enhancement of commutation reliability of an HVDC inverter by means of an inductive filtering method," IEEE Trans. Power Electron., vol. 28, No. 11, pp. 4917-4929, Nov. 2013.
E. Rahimi, et al., "Commutation failure analysis in multi-infeed HVDC systems," IEEE Trans. Power Del., vol. 26, No. 1, pp. 378-384, Jan. 2011.
Y. Shao, Y. Tang, "Fast evaluation of commutation failure risk in multi-infeed HVDC systems," IEEE Trans. Power Syst., vol. 33, No. 1, pp. 646-653, Jan. 2018.
X. Liu, et al., "A concurrent commutation failure detection method for multi-infeed HVDC systems," IEEE18th Workshop on Control and Modeling for Power Electronics, Aug. 2017, pp. 1-5.
G. Li, et al., "A method of detecting commutation failure in multi-infeed HVDC systems based on critical failure impedance boundary", Proc. IEEE Power Energy Soc. General Meeting, pp. 1-5, Jul. 2017.
L. Liu, et al., "A calculation method of pseudo extinction angle for commutation failure mitigation in HVDC" IEEE Trans. Power Del., vol. 34, No. 2, pp. 777-779, Apr. 2019.
S. Mirsaeidi, et al., "A predictive control strategy for mitigation of commutation failure in LCC-based HVDC systems," IEEE Trans. Power Electron., vol. 34, No. 1, pp. 160-172, Jan. 2019.
Z. Wei, et al., "Direct-current predictive control strategy for inhibiting commutation failure in HVDC converter," IEEE Trans. Power Syst., vol. 29, No. 5, pp. 2409-2417, Sep. 2014.
J.V. Wijayakulasooriya, et al., "Fast non-recursive extraction of individual harmonics using artificial neural networks," IEE Proc.-Gener. Transm. Distrib., vol. 152, No. 4, Jul. 2005.
C.V.Thio, et al., "Commutation Failures in HVDC Transmission Systems," IEEE Transactions on Power Delivery, vol. 11, No. 2, Apr. 1996.

* cited by examiner

```
                ┌─────────────────────────────────────────┐
                │ collecting instantaneous values of three-phase valve │
                │ side current and calculating derivatives of the three- │
                │ phase valve side current according to the instantaneous │──── S1
                │ values of three-phase valve side current, the derivative │
                │      includes three states: positive, negative and zero │
                └─────────────────────────────────────────┘
                                    │
                                    ▼
                ┌─────────────────────────────────────────┐
                │ determining locations of incoming valve and ongoing │
                │     valve in the 12-pulse inverter according to the │──── S2
                │      derivatives of the three-phase valve side current; │
                │ calculating energy accumulation characteristics of the │
                │ 12-pulse inverter based on the valve side current of the │
                │       incoming valve and ongoing valve, the energy │
                │  accumulation characteristics include real-time energy │
                │           difference and limit energy difference │
                └─────────────────────────────────────────┘
                                    │
                                    ▼
                ┌─────────────────────────────────────────┐──── S3
                │  predicting whether the commutation failure from the │
                │      incoming valve to the ongoing valve will happen │
                │   according to the states of the derivatives of the three- │
                │  phase valve side current and the energy accumulation │
                │         characteristics of the 12-pulse inverters │
                └─────────────────────────────────────────┘
```

Fig.1

COMMUTATION FAILURE PREDICTION METHOD, DEVICE AND STORAGE MEDIUM BASED ON ENERGY ACCUMULATION FEATURES OF INVERTER

CROSS-REFERENCE TO RELATED APPLICATION

This application claims priority to Chinese Patent Application No. 202010682688.1, filed on Jul. 15, 2020, which is hereby incorporated by reference in its entirety.

TECHNICAL FIELD

This disclosure relates to the field of relay protection technology, in particular to a commutation failure prediction method, device and storage medium based on energy accumulation features of inverter.

BACKGROUND

With the improvement of voltage and transmission power level of HVDC transmission system, the probability of inverter commutation failure gradually increases. Commutation failure will cause DC transmission power to drop, successive commutation failure can even suspend power transmission and result in blocking of DC system, greatly endangering the safety and stability of DC system. Thus it necessary to detect the occurrence of commutation failure.

At present, the common detection methods for commutation failure are measuring methods, since they are based on the feature of system after commutation failure, the measuring methods are relatively conservative and not speedy enough. Besides, on account of the dependence on phasor calculation in these measuring methods, it is easy to misjudge the happen of commutation failure in practical engineering due to the disturbance.

SUMMARY

In view of the above analysis, the embodiment of this disclosure provides a commutation failure prediction method and device based on energy accumulation features of inverter, in order to solve the problem of the existing detection methods of commutation failure that not quick enough and easy to misjudge due to disturbance.

On the one hand, this disclosure provides a commutation failure prediction method based on energy accumulation features of inverter. The inverter is a 12-pulse inverter; the commutation failure prediction method includes the following steps:

collecting instantaneous values of three-phase valve side current and calculating derivatives of the three-phase valve side current according to the instantaneous values of three-phase valve side current; the derivative includes three states: positive, negative and zero;

determining the locations of incoming valve and ongoing valve in the 12-pulse inverter according to the derivatives of three-phase valve side currents; calculating energy accumulation features of the 12-pulse inverter based on the valve side current of the incoming valve and ongoing valve, the energy accumulation features include real-time energy difference and limit energy difference;

predicting whether the commutation failure from the incoming valve to the ongoing valve will happen according to the states of the derivatives of the three-phase valve side current and the energy accumulation features of the 12-pulse inverter.

Further, the equation of the real-time energy difference of the 12-pulse inverter is:

$$|W_{Y\text{-}D}| = L_c i_1 i_2$$

where $|W_{Y\text{-}D}|$ is the real-time energy difference of the 12-pulse inverter, $L_c$ is the equivalent commutation inductance of the inverter, $i_1$ is valve-side current of the incoming valve and $i_2$ is valve-side current of the ongoing valve.

Further, the equation of the limit energy difference of the 12-pulse inverter is:

$$|W_{Y-D}|_{Max} = \frac{E^2}{8\omega^2 L_c}(\cos\alpha + \cos\gamma_{min})^2$$

$$\omega = 2\pi f$$

where $|W_{Y\text{-}D}|_{max}$ is the limit energy difference of the 12-pulse valve inverter, E is the RMS(Root-Mean-Square) value of the AC bus voltage on the inverter side, $\omega$ is the angular frequency of HVDC transmission system, $L_c$ is the equivalent commutation inductance of the inverter; $\alpha$ is the firing angle, $\gamma_{min}$ is the minimum extinguishing angle and f is the frequency of HVDC transmission system.

Further, predicting whether the commutation failure from the incoming valve to the ongoing valve will happen according to the states of the derivatives of three-phase valve side current and the energy accumulation features of the 12-pulse inverter includes:

judging the states of the derivatives of three-phase valve-side current are the same or not, if the states are same, predicting the commutation failure will happen; if not, calculating the energy difference $W_{cri}$ between the real-time energy difference and the limit energy difference of the 12-pulse inverter;

if $W_{cri.} < 0$, predicting the commutation failure will happen; if $W_{cri.} > 0$ predicting the commutation failure will not happen.

Further, calculating the energy difference $W_{cri}$ by the following equation:

$$W_{cri.} = |W_{Y\text{-}D}|_{max} - |W_{Y\text{-}D}|$$

On the other hand, the embodiment of this disclosure provides a commutation failure prediction device based on energy accumulation features of inverter, including:

a first processor of data acquisition: it is configured to collect instantaneous values of three-phase valve side current and calculate derivatives of the three-phase valve side current according to the instantaneous values of three-phase valve side current; the derivative includes three states: positive, negative and zero;

a second processor of energy difference calculation: it is configured to determine locations of incoming valve and ongoing valve in the 12-pulse inverter according to the derivatives of the three-phase valve side current; and calculate energy accumulation features of the 12-pulse inverter based on the valve side current of the incoming valve and ongoing valve, the energy accumulation features include real-time energy difference and limit energy difference;

a third processor of commutation failure prediction: it is configured to predict whether the commutation failure from the incoming valve to the ongoing will happen according to the states of the derivatives of three-phase valve side current and the energy accumulation features of the 12-pulse inverter.

Further, the second processor of energy difference calculation is configured to calculate the real-time energy difference of 12-pulse inverter according to following equation:

$$|W_{Y\text{-}D}| = L_c i_1 i_2$$

where $|W_{Y\text{-}D}|$ is the real-time energy difference of the 12-pulse inverter, $L_c$ is the equivalent commutation inductance of the inverter, $i_1$ is valve-side current of the incoming valve and $i_2$ is valve-side current of the ongoing valve.

Further, the second processor of energy difference calculation is configured to calculate the limit energy difference of the 12-pulse inverter by the following equation:

$$|W_{Y\text{-}D}|_{Max} = \frac{E^2}{8\omega^2 L_c}(\cos\alpha + \cos\gamma_{min})^2$$

$$\omega = 2\pi f$$

where $|W_{Y\text{-}D}|_{max}$ is the limit energy difference of the 12-pulse inverter, E is the RMS value of the AC bus voltage on the inverter side, $\omega$ is the angular frequency of HVDC transmission system, $L_c$ is the equivalent commutation inductance of the inverter, $\alpha$ is the firing angle, $\gamma_{min}$ is the minimum extinguishing angle and f is the frequency of HVDC transmission system.

Further, the third processor of commutation failure prediction is configured to perform the following process:

judging the states of the derivatives of three-phase valve-side current are the same or not, if the states are same, the third processor of commutation failure prediction is configured to predict the commutation failure will happen; if not, the third processor of commutation failure prediction is configured to calculate the energy difference $W_{cri.}$ between the real-time energy difference and the limit energy difference of the 12-pulse inverter;

if $W_{cri.}$<0, the third processor of commutation failure prediction is configured to predict the commutation failure will happen; if $W_{cri.}$>0, the third processor of commutation failure prediction is configured to predict the commutation failure will not happen.

Further, the third processor of commutation failure prediction is configured to calculate the energy difference $W_{cri.}$ by the following equation:

$$W_{cri.} = |W_{Y\text{-}D}|_{Max} - |W_{Y\text{-}D}|$$

This disclosure further provides a storage medium encoded with a set of machine-executable instructions to perform a commutation failure prediction method based on energy accumulation features of inverter, the method comprising:

collecting instantaneous values of three-phase valve side current and calculating derivatives of the three-phase valve side current according to the instantaneous values of three-phase valve side current; the derivative includes three states: positive, negative and zero;

determining the locations of incoming valve and ongoing valve in the 12-pulse inverter according to the derivatives of three-phase valve side currents; calculating energy accumulation features of the 12-pulse inverter based on the valve side current of the incoming valve and ongoing valve, the energy accumulation features include real-time energy difference and limit energy difference;

predicting whether the commutation failure from the incoming valve to the ongoing valve will happen according to the states of the derivatives of the three-phase valve side current and the energy accumulation features of the 12-pulse inverter.

Compared with the existing technology, this disclosure can achieve at least one of the following beneficial effects.

1. A commutation failure prediction method based on accumulation energy features of inverter, predicting whether the commutation failure will happen before the commutation failure happens by using the derivatives of the three-phase valve side current. If the states of the derivatives of three-phase valve side current are the same, predicting the commutation failure will happen. If not, predicting whether the commutation failure will happen according to the energy accumulation features of 12-pulse inverter. This method is simple and it is easy to implement, solves the problems of the existing methods which are not quick enough and easy to misjudge due to disturbance. The commutation failure prediction method based on accumulation energy features of inverter can effectively improve the accuracy of commutation prediction.

2. Calculating the real-time energy difference and the limit energy difference of 12-pulse inverter by the valve side current of the incoming valve and the ongoing valve provides the basis and support for judging whether the commutation failure will happen when the states of the derivatives of the three-phase valve side current are not the same. The commutation failure prediction method based on accumulation energy features of inverter provides a quick and simple way to predict whether the commutation failure, solves the problems of existing methods which need complex phasor calculations. The commutation failure prediction method reduces the complexity of calculation and improves the efficiency of calculation, and improve the quickness to protect the system.

3. Predicting commutation failure by judging whether the states of the derivatives of three-phase valve side current are same or not. When the states are not same, predicting commutation failure by the energy accumulation features of the 12-pulse inverter. The commutation failure prediction method that using derivatives of the three-phase valve side current and the energy accumulation features provides a quick and simple way to predict the commutation failure, and effectively improves the accuracy of commutation prediction.

In this disclosure, the above technical schemes can also be combined with each other to realize more optimal combination schemes. Other features and advantages of the present disclosure will be described in a subsequent specification, and some of the advantages may become apparent from the specification or may be understood through the implementation of the present disclosure. The purpose and other advantages of the disclosure may be realized and obtained through the contents specifically indicated in the specification and the appended drawings.

BRIEF DESCRIPTION OF DRAWINGS

The appended drawings are used only for the purpose of showing specific embodiments and are not considered to be a limitation of the present disclosure. Throughout the appended drawings, the same reference symbols represent the same components.

FIG. 1: a flow chart of commutation failure prediction method based on energy accumulation features of inverter;

wherein: 100—first processor of acquisition; 200—second processor of energy difference calculation; 300—third processor of commutation failure prediction.

DETAILED DESCRIPTION OF THE EMBODIMENTS

The proposed method is described in detail below in conjunction with the diagrams in the appendix. It should be emphasized that the following description is only exemplary and is not intended to limit the scope of this disclosure and its disclosure.

Since they are based on the feature of system after commutation failure, existing measuring methods to detect commutation failure are relatively conservative and not speedy enough. Besides, on account of the dependence on phasor calculation in these measuring methods, it is easy to misjudge the happen of commutation failure in practical engineering due to the disturbance.

Hence, this disclosure provides a commutation failure prediction method and device based on energy accumulation features of inverter, in order to predict whether the commutation failure will happen before the commutation process.

Predicting whether commutation failure will happen by the derivatives of three-phase valve side current. If the states of the derivatives three-phase valve side current are the same, predicting the commutation failure will happen. If not, according to table "inverter operation state corresponding to different states of derivatives of three-phase valve-side current" determining locates of incoming valve and ongoing valve. According to the valve side current of the incoming valve and the ongoing valve, calculating real-time energy difference and limit energy difference of the 12-pulse inverter and predicting the occurrence of commutation failure by using the difference of real-time energy difference and limit energy difference. This commutation failure prediction method is simple to calculate and easy to implement, solves the problems of the existing methods which are not quick enough and easy to misjudge due to disturbance. The commutation failure prediction method based on accumulation energy features of inverter can effectively improve the accuracy of commutation prediction.

A specific embodiment of the disclosure discloses a commutation failure prediction method based on energy accumulation features of inverter, as shown in FIG. 1. The commutation failure prediction method based on energy accumulation features of inverter includes follow steps:

Step S1: collecting instantaneous values of three-phase valve side current of the inverter, calculating derivatives of the three-phase valve side current according to the instantaneous values of three-phase valve side current; the derivative includes three states: positive, negative and zero.

Figure 2:
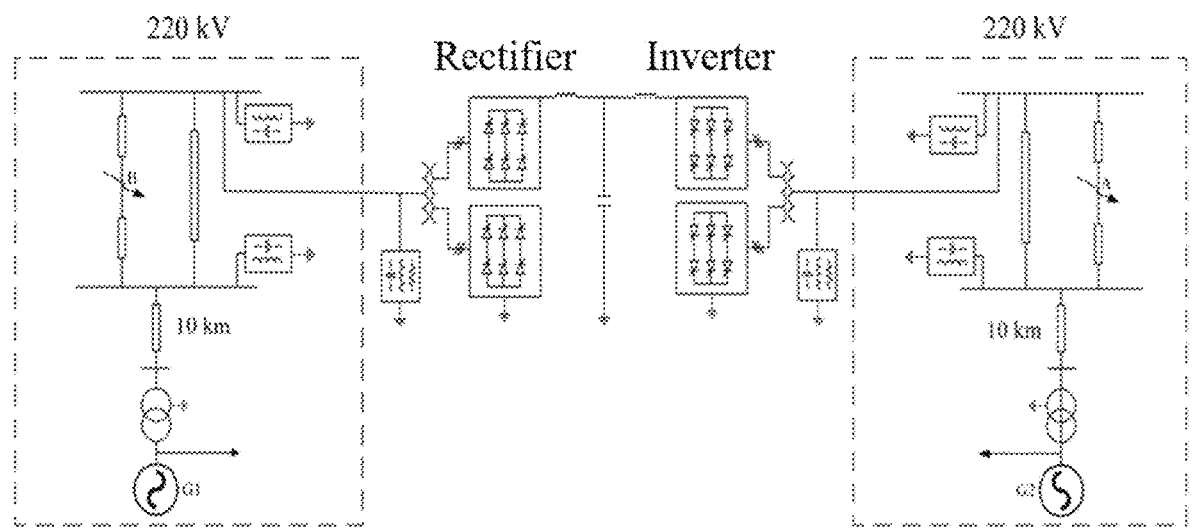
FIG. 2: a system diagram of HVDC transmission system.

Specifically, as the HVDC/AC transmission system shown in FIG. 2, it includes rectifiers, inverters and DC transmission lines.

According to the sampling frequency, collecting the instantaneous values of three-phase valve side current on the inverter. Calculating the derivatives of the three-phase valve side current, based on the slope of the instantaneous values of the three-phase current. In addition, the derivatives of the three-phase valve side current can also be obtained by using the other common methods such as sliding window differential calculating methods.

Figure 3:
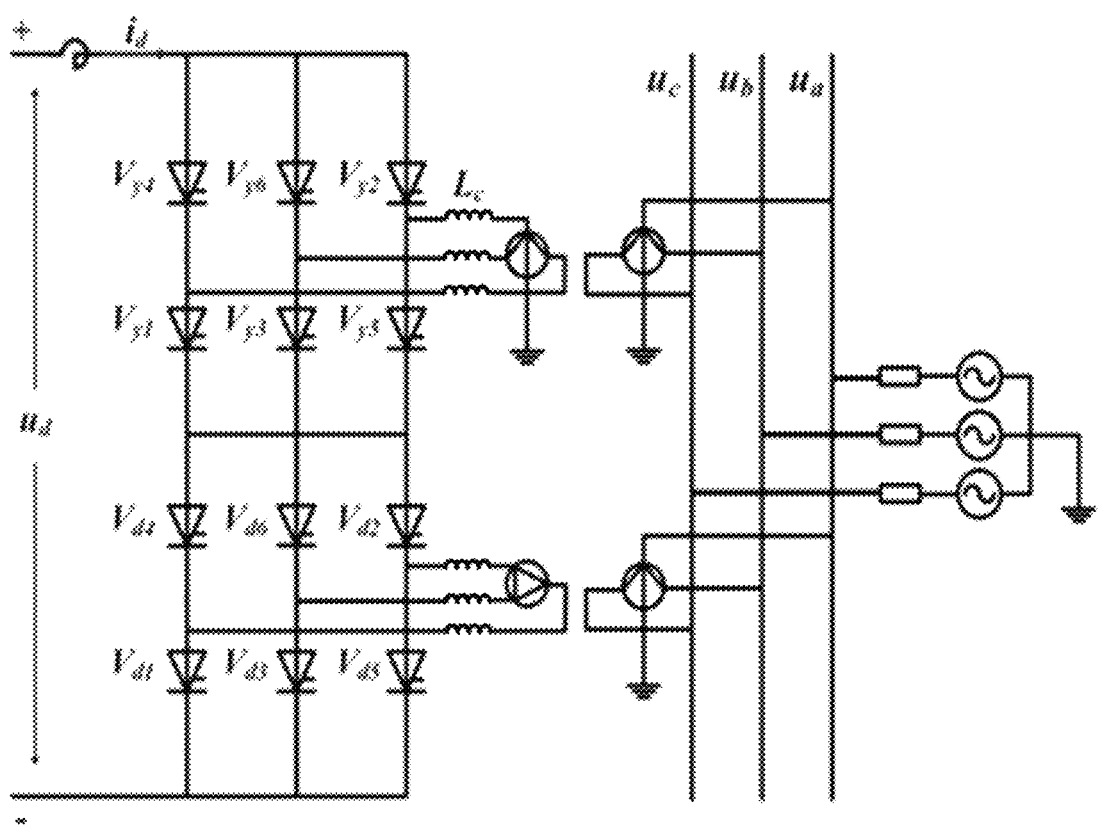
FIG. 3: a schematic diagram of 12-pulse inverter.

In the FIG. 3, three-phase valve side current is the current that flow through the branches which connect the inverter equivalent commutation inductance $L_c$ and the transformer. Installing measuring equipment on each branch and collecting instantaneous values of the three-phase valve side current can be collect by the measuring equipment.

Step S2:

determining locations of incoming valve and ongoing valve in the 12-pulse inverter according to the derivatives of three-phase valve side current; based on the valve side current of the incoming valve and ongoing valve, calculating the energy accumulation features of the 12-pulse inverter, where the energy accumulation features include real-time energy difference and limit energy difference. Specifically, after obtaining the derivatives of the three-phase valve side current, determining locations of incoming valve and ongoing valve as well as conducting valve by referring to table 1 below. "+", "−" and "0" in the following table respectively represent the derivatives of the three-phase valve side current are positive, negative and zero.

TABLE 1 inverter operation state corresponding to different states of derivatives of three-phase valve-side current

| | Outgoing valve | Incoming valve | Conducting valve |
|---|---|---|---|
| $A^{(+,-,0)}$ | 1 | 3 | 2 |
| $A^{(+,0,-)}$ | 2 | 4 | 3 |
| $A^{(0,-,+)}$ | 3 | 5 | 4 |
| $A^{(-,+,0)}$ | 4 | 6 | 5 |
| $A^{(-,0,+)}$ | 5 | 1 | 6 |
| $A^{(0,+,-)}$ | 6 | 2 | 1 |
| $A^{(+,+,+)}$ | — | — | — |
| $A^{(-,-,-)}$ | — | — | — |
| $A^{(0,0,0)}$ | — | — | — |

After determining locations of the incoming valve, ongoing valve and the conducting valve, the valve side current corresponding to the incoming valve and the ongoing valve can be obtained because it's the current of a certain phase of the three-phase valve side current in steps S1, it can be obtained by the measuring equipment.

According to the features of 12-pulse inverter, the 12-pulse inverter has 5 conducting valves during the commutation process, where the bridge which has three conducting valves is the commutating bridge. So if the measuring equipment can collect three valve-side current signals in one bridge, this bridge can be regarded as the commutating bridge and the other bridge is the Non-commutating bridge. So the incoming valve and the ongoing valve can be located and their valve currents can be obtained.

Take working condition $V_{y1}$-$V_{y2}$-$V_{y3}$-$V_{d1}$-$V_{d2}$ as example. There are three branches in the Y bridge working in the conducting state, so Y bridge of the inverter is the commutating bridge. Collecting valve side current of the incoming valve and the ongoing valve by using measuring equipment of the three-phase current of the transformer connected with the Y bridge. And because there are only two branches working in the conducting state, the D bridge is not in commutating state. Based on the valve current of incoming valve and ongoing valve, calculating the energy accumulation features of inverter, which include real-time energy difference and limit energy difference.

Preferably, the equation of the real-time energy difference of the 12-pulse inverter is $$|W_{Y-D}| = L_c i_1 i_2 \quad (1)$$

where $|W_{Y-D}|$ is the real-time energy difference of the 12-pulse inverter, $L_c$ is the equivalent commutation inductance of the inverter i1 is valve-side current of the incoming valve and i2 is valve-side current of the ongoing valve.

Preferably, the equation of the limit energy difference of the 12-pulse inverter is:

$$|W_{Y-D}|_{Max} = \frac{E^2}{8\omega^2 L_c}(\cos\alpha + \cos\gamma_{min})^2 \quad (2)$$

$$\omega = 2\pi f \quad (3)$$

where $|W_{Y-D}|_{max}$ is the limit energy difference limitation of the 12-pulse inverter, E is the RMS(Root-Mean-Square) value of the AC bus voltage on the inverter side, $\omega$ is the angular frequency of HVDC transmission system, $L_c$ is the equivalent commutation inductance of the inverter, $\alpha$ is the firing angle, $\gamma_{min}$ is the minimum extinguishing angle and f is the frequency of HVDC transmission system.

The schematic wiring diagram of 12-pulse inverter is shown in FIG. 3. The inverter includes Y bridge and D bridge, where $V_{y1} \neq V_{y6}$ and $V_{d1} \sim V_{d6}$ are respectively 6 converter valves in Y bridge and D bridge. Each valve is conducted in sequence. In normal operating state, 12-pulse inverter works in two states: one is non-commutation state another is commutating state. When the 12-pulse inverter is in the non-commutation state, where are 4 conducting valves. when the 12-pulse inverter is in the commutation state, where are 5 conducting valves. For example, suppose valves $V_{y1}$-$V_{y2}$-$V_{y3}$-$V_{d1}$-$V_{d2}$ are conducted, calculating the accumulated energy of Y bridge by:

$$W_Y = \tfrac{1}{2} L_c i_d^2 + \tfrac{1}{2} L_c i_{ay}^2 + \tfrac{1}{2} L_c i_{by}^2 \quad (4)$$

Calculating the accumulated energy of D bridge can be calculated by:

$$W_D = \tfrac{1}{2} L_c (i_{vd1}^2 + i_{vd2}^2) = L_c i_d^2 \quad (5)$$

By subtracting equation (5) from the equation (4), Obtaining $W_Y - W_D = \tfrac{1}{2} L_c i_{ay}^2 + \tfrac{1}{2} L_c i_{by}^2 - \tfrac{1}{2} L_c i_d^2$. Then by substituting $i_d = i_{ay} - i_{by}$ into $W_Y - W_D$ and taking the absolute value, obtaining the real-time energy difference of the 12-pulse inverter is:

$$|W_{Y-D}| = L_c i_{ay} i_{by} = L_c i_1 i_2 \quad (6)$$

Considering the basic equation of AC/DC transmission system, there is:

$$i_1 = i_d(t) - \frac{E}{\sqrt{2}\,\omega L_c}(\cos\alpha - \cos\omega t) \quad (7)$$

$$i_2 = \frac{E}{\sqrt{2}\,\omega L_c}(\cos\alpha - \cos\omega t) \quad (8)$$

Substituting formula (7) and (8) into formula (6) and getting the relationship equation between $|W_{Y-D}|$ and $\omega t$. Calculating the untrivial solution of the derivatives of the $|W_{Y-D}|$ and there is $$\omega t_{\bullet 2} = \arccos\left(\cos\alpha - \frac{\omega L_c i_d}{\sqrt{2}\,E}\right).$$

Substituting the untrivial solution into formula (7) and (8) and getting the maximum value of $W_{Y-D}$:

$$|W_{Y-D}|_{Max} = \frac{1}{4} L_c i_d^2 \quad (9)$$

At the beginning and the end of the normal commutation progress, there is $i_1 = i_d$, $i_2 = i_d$ and the effective value of the AC bus voltage on the inverter side E can be regarded as rated value EN, triggered angle $\alpha = 41°$. To calculate the maximum of $i_d$, letting the extinction angle $\gamma = \gamma_{min}$, there is:

$$i_{dmax} = \frac{\sqrt{2}\,E}{2\omega L_c}(\cos\alpha + \cos\gamma_{min}) \quad (10)$$

Substituting formula (10) into formula (9), calculating the limit energy as follows:

$$|W_{Y-D}|_{Max} = \frac{E^2}{8\omega^2 L_c}(\cos\alpha + \cos\gamma_{min})^2$$

Calculating the real-time energy difference and the limit energy difference of 12-pulse inverter by the valve side current of the incoming valve and the ongoing valve provides the basis and support for judging whether the commutation failure will happen when the states of the derivatives of the three-phase valve side current are not the same. This commutation failure prediction method provides a quick and simple way to predict the commutation failure, solves the problems of existing methods which need complex phasor calculations. The commutation failure prediction method reduces the complexity of calculation and improves the efficiency of calculation, and improve quickness to protect the system.

Step S3:

Predicting whether the commutation failure from the incoming valve to the ongoing valve will happen, according to the states of the derivatives of three-phase valve side current and the energy accumulation features of the 12-pulse inverter. In particular, the states of derivative of the three-phase valve side current include positive, negative and zero states. If the derivatives of the three-phase valve side current are all positive or negative at the same time, predicting the commutation failure will occur. If the derivatives of the three-phase valve side current are not the same, calculating the real-time energy difference and the limit energy difference of the 12-pulse inverter according to step S2 and predicting whether the commutation failure will happen or not. If predict the commutation failure will happen, sending the signal of commutation failure to the system.

Preferably, based on the states of the derivatives of three-phase valve side current and the energy accumulation features of the 12-pulse inverter, predicting whether the commutation failure from the incoming valve to the ongoing valve will happens, which includes:

Judging the states of derivatives of three-phase valve-side current are the same or not. If they are same, predicting the commutation failure will happen. If not, calculating the energy difference $W_{cri.}$ between the real-time energy difference and the limit energy difference of the 12-pulse inverter. If $W_{cri.}<0$, predicting the commutation failure will happen. If $W_{cri.}>0$, predicting the commutation failure will not happen.

Preferably, calculating the energy difference $W_{cri.}$ by the following equation: $W_{cri.}=|W_{Y-D}|_{Max}-|W_{Y-D}|_o$ If the states of the derivatives of the three-phase valve side current are same such as all positive or negative at the same time, predicting the commutation failure will occur. If the states of derivatives of the three-phase valve side current are not the same, calculating the energy difference $W_{cri.}$ between the real-time energy difference and the limit energy difference of the 12-pulse, where $W_{cri.}$ can be calculated by equation: $W_{cri.}=|W_{Y-D}|_{Max}-|W_{Y-D}|$. If $W_{cri.}<0$ predicting the commutation failure will happen. If $W_{cri.}>0$ predicting the commutation will not happen.

Predicting whether the commutation failure will happen by judging the states of the derivatives of three-phase valve-side current are the same or not. If they are same, predicting commutation failure will happen. If not, predicting whether the commutation failure will happen according to the energy accumulation features of 12-pulse inverter. The commutation failure prediction method that using derivatives of the three-phase valve side current and the energy accumulation features provides a quick and simple way to predict the commutation failure, and effectively improves the accuracy of commutation prediction.

Compared to existing technologies, this commutation failure prediction method provides a commutation failure prediction method based on energy accumulation features of inverter. Predicting commutation failure by the states of the derivatives of three-phase valve side current. If the states of the derivatives of three-phase valve side current are the same, predicting commutation failure will happen. If not, predicting whether commutation failure will happen according to the energy accumulation features of the 12-pulse inverter. This commutation failure prediction method is simple to calculate and easy to implement, solves the problem of the existing methods which are not quick enough and easy to misjudge due to disturbance. The commutation failure prediction method based on accumulation energy features of inverter can effectively improve the accuracy of commutation prediction.

Figure 4:
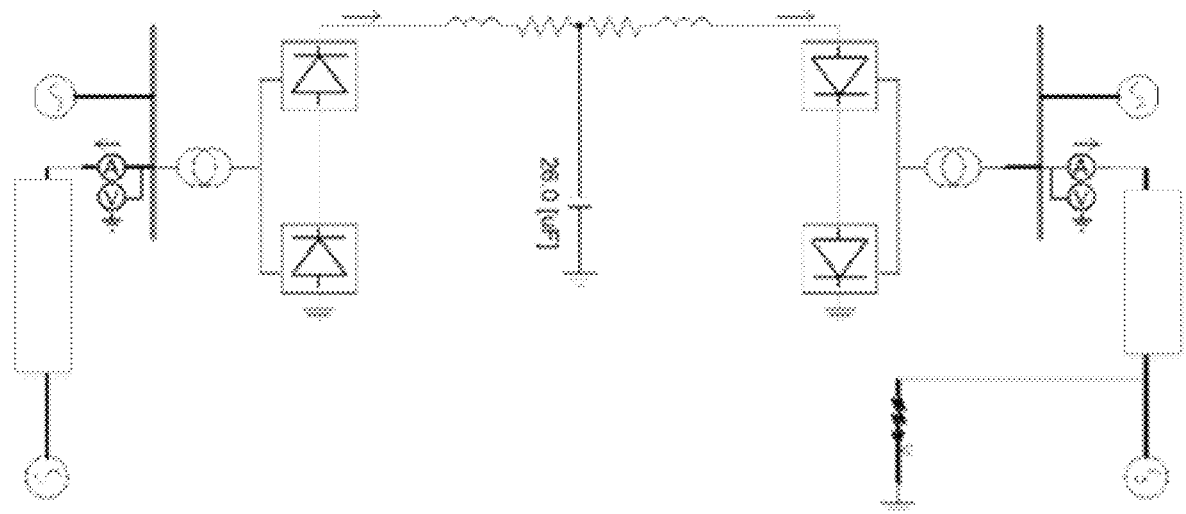
FIG. 4: a system diagram of Cigre_Benchmark AC/DC transmission system.

As shown in FIG. 4 of Cigre_Benchmark AC/DC transmission system, When the AC-DC transmission system operates under different fault resistances, the prediction method of commutation failure is verified by time domain simulation. In the test system, DC voltage is 500 kV, rated DC current is 2 kA, and DC transmission power is 1000 MVA. The RMS value of AC-side voltage is 220 kV. The rectifier station and inverter station are connected with AC system via 10 km transmission lines. The limitation of extinction angle is 15°.

Figure 5:
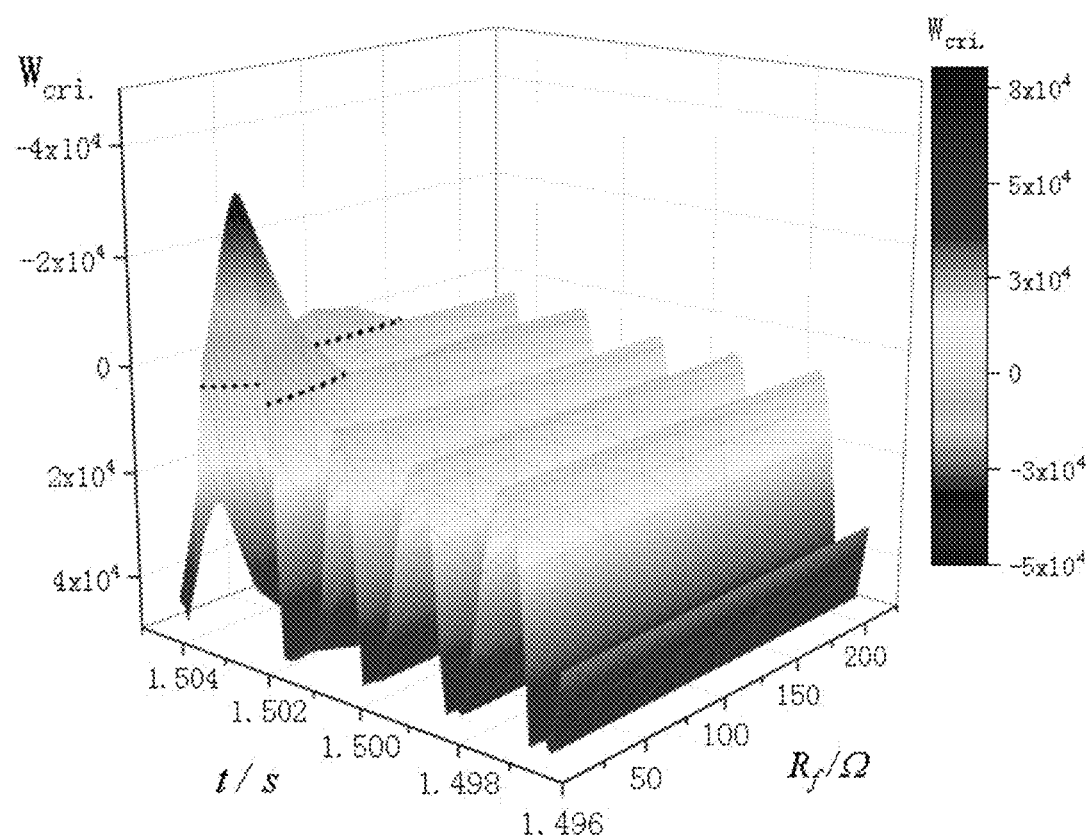
FIG. 5: a schematic diagram of calculation results of energy difference $W_{cri.}$ in the case of phase A-to-ground short circuit fault.

Suppose phase A-to-ground short circuit fault occurs at inverter-side AC bus at t=1.5 s with the fault resistance being 0~200Ω, real-time energy difference $W_{cri.}$ is shown in FIG. 5, where the dashed lines are contour lines of $W_{cri.}=0$. It can be seen from FIG. 5 that, when t<1.5 s or $R_f$>117Ω, $W_{cri}$>0 thus commutation failure will not occur. When t>1.5 s and $R_f$≤117Ω, $W_{cri}$ passes the zero point at different instants, thus predicting commutation failure will occur, and sending commutation failure prediction signal to the system.

Figure 6:
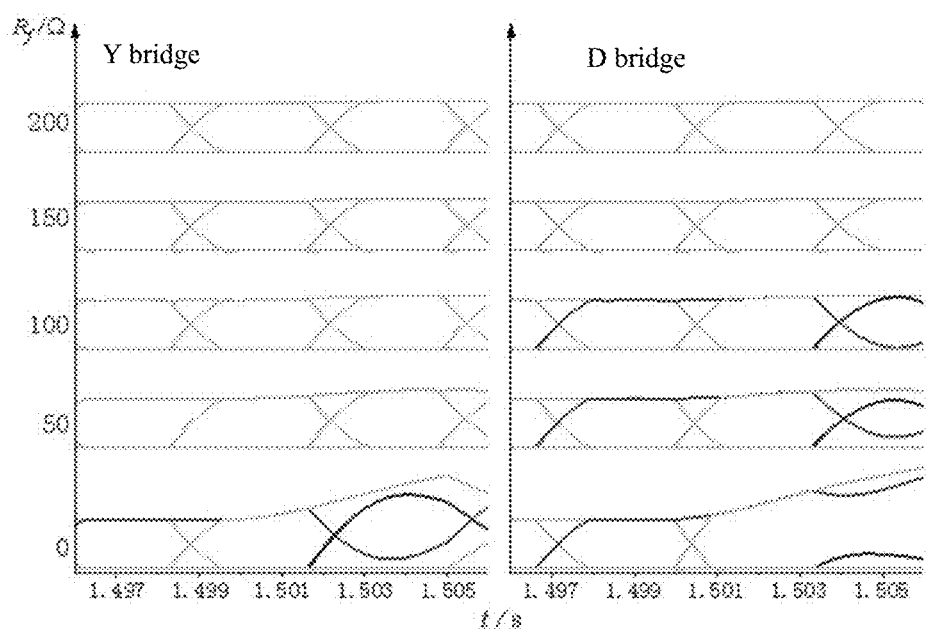
FIG. 6: waveforms of inverter valve currents in the case of phase A-to-ground short circuit fault.

When fault resistance $R_f$={0 Ω, 50 Ω, 100 Ω, 150 Ω, 200Ω }, the waveforms of inverter valve-side currents corresponding to the relevant incoming valve of the Y bridge and D bridge are shown in FIG. 6. When $R_f$={0 Ω, 50 Ω, 100Ω} commutation failure occurs at t=1.5030 s, 1.5047 s and 1.5047 s. There is no commutation failure when $R_f$={150 Ω, 200Ω}, which is consistent with FIG. 5.

Suppose phase A-to-ground short circuit fault occurs at inverter-side AC bus at t=1.5 s with different fault resistance, the valve locating result is shown in table 2. When the Rf=0Ω, commutation fault occurred in the valve Vy3 to Vy5. When the Rf=50 Ω, 100 Ω, 150Ω, the commutation fault occurs in the valve Vy3 to Vy5, when Rf=200Ω, no commutation failure happened.

TABLE 2

| locating results of phase A-to-ground short circuit fault | | | | | |
|---|---|---|---|---|---|
| Rf/Ω | 0 | 50 | 100 | 150 | 200 |
| 0(20) | Vy3 → Vy5 | Vd3 → Vd5 | Vd3 → Vd5 | Vd3 → Vd5 | — |

Figure 7:
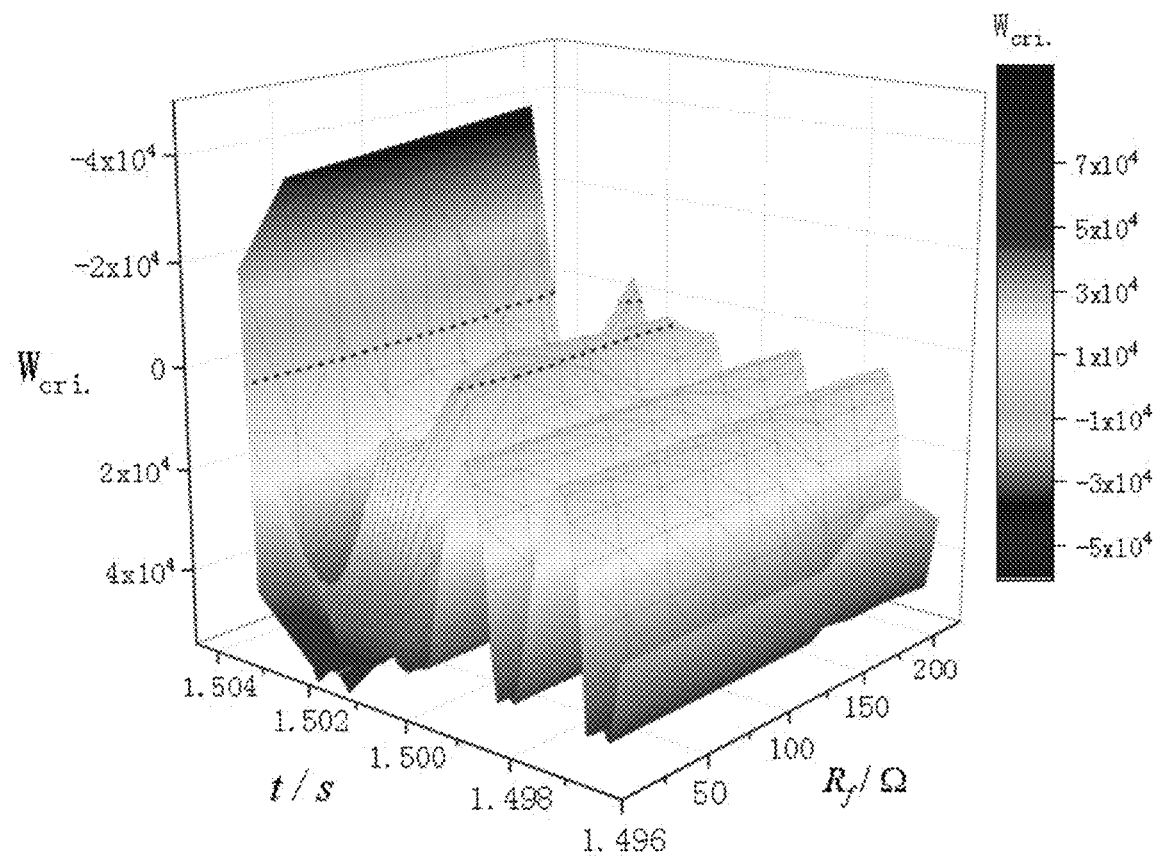
FIG. 7: a schematic diagram of calculation results of energy difference $W_{cri.}$ in the case of phase BC-to-ground short circuit fault.

Suppose phase BC-to-ground short circuit fault occurs at inverter-side AC bus at t=1.5 s with the fault resistance being 0~200Ω, the energy difference is shown in FIG. 7 where the dashed lines are contour lines of $W_{cri.}=0$. It can be seen from FIG. 7 that, when t<1.5 s, $W_{cri}$>0, thus predicting the commutation failure will not occur. When t>1.5 s, $W_{cri}$ passes the zero point at different instants, thus predicting the commutation failure will occur and sending commutation failure prediction signal to the system.

Figure 8:
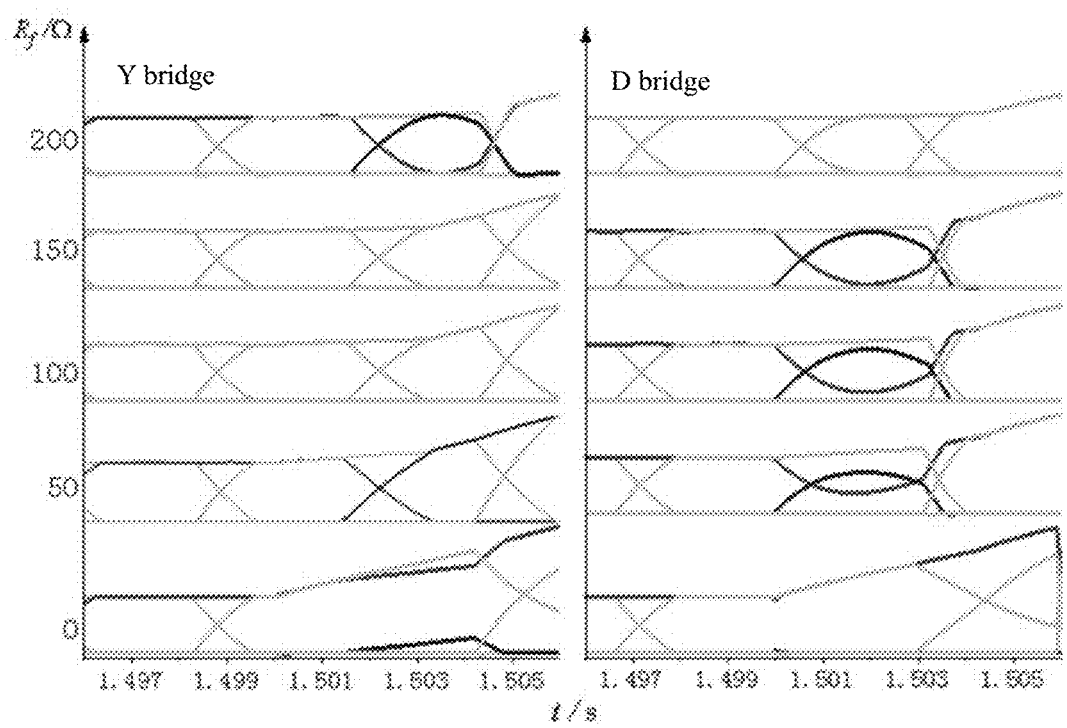
FIG. 8: waveforms of inverter valve currents in the case of phase BC-to-ground short circuit fault.

The waveforms of inverter valve currents corresponding to the relevant incoming valve of Y bridge and D bridge when $R_f$={0 Ω, 50 Ω, 100 Ω, 150 Ω, 200Ω} are shown in FIG. 8. It can be seen from FIG. 8 that, commutation failure occurs at t=1.5017 s, 1.5017 s, 1.5017 s, 1.5017 s and 1.5032 s, which is consistent with the result in FIG. 7.

Suppose phase BC-to-ground short circuit fault occurs at inverter-side AC bus at t=1.5 s with different fault resistance. The valve locating results are shown in table 3. When the Rf=0 Ω, 50 Ω, 100 Ω, 150Ω, commutation fault occurred in the valve Vd2 to Vd4. When the Rf=200Ω, the commutation fault occurs in the valve Vy3 to Vy5.

TABLE 3

| locating results of phase BC-to-ground short circuit fault | | | | | |
|---|---|---|---|---|---|
| Rf/Ω | 0 | 50 | 100 | 150 | 200 |
| 0(20) | Vd2 → Vd4 | Vd2 → Vd4 | Vd2 → Vd4 | Vd2 → Vd4 | Vy3 → Vy5 |

Figure 9:
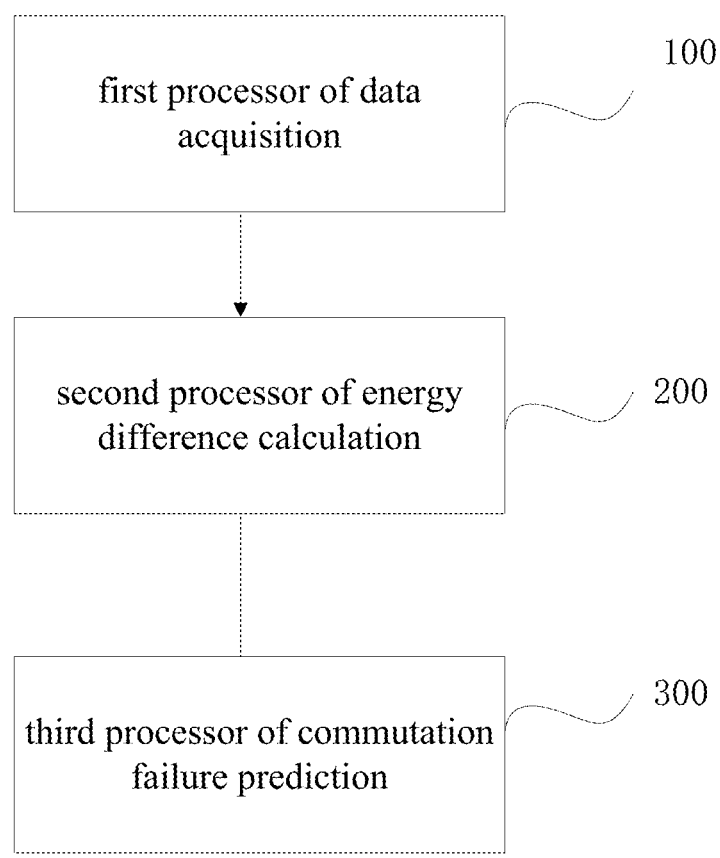
FIG. 9: a structure diagram of commutation failure prediction device based on energy accumulation features of inverter.

Another specific embodiment of this disclosure discloses a commutation failure prediction device based on energy accumulation features of inverter, which is shown in FIG. 9. The commutation failure prediction device includes:

a first processor of data acquisition 100: configured to collect instantaneous values of three-phase valve side current and calculate derivatives of the three-phase valve sides current according to the instantaneous values of three-phase valve side current, the derivative includes three states: positive, negative and zero states;

a second processor of energy difference calculation 200: configured to determining locations of incoming valve and ongoing valve in the 12-pulse inverter according to the derivatives of the three-phase valve side current and calculate energy accumulation features based on the valve side current of the incoming valve and the ongoing valve, the energy accumulation features include real-time energy difference and limit energy difference;

a third processor of commutation failure prediction 300: configured predict whether the commutation failure from the incoming valve to the ongoing will happen according to the states of the derivatives of the three-phase valve side current and the energy accumulation features of the 12-pulse inverter.

A commutation failure prediction device based on the energy accumulation features of inverter, configured to predict whether commutation failure will by the derivatives of the three-phase valve side current. If the states of derivatives of the three-phase valve side current are the same, the device is configured to predict commutation failure will happen. If not, the commutation failure prediction device is configured to predict the occurrence of commutation failure according to the energy accumulation features of 12-pulse inverter. This device is simple to calculate and easy to implement, solves the problem of the existing devices are not quick enough and easy to misjudge due to disturbance. The commutation failure prediction device based on accumulation energy features of inverter can effectively improve the accuracy of commutation prediction.

Preferably, the second processor of energy difference calculation is configured to calculate real-time energy difference of 12-pulse inverter according to the following equation:

$$|W_{Y-D}|=L_c i_1 i_2$$

where $|W_{Y-D}|$ is the real-time energy difference of the 12-pulse inverter, $L_c$ is the equivalent commutation inductance of the inverter, i1 is valve-side current of the incoming valve and i2 is valve-side current of the ongoing valve.

Preferably, the second processor of energy difference calculation is configured to calculate the limit energy difference by the following equation:

$$|W_{Y-D}|_{Max} = \frac{E^2}{8\omega^2 L_c}(\cos\alpha + \cos\gamma_{min})^2$$

$$\omega = 2\pi f$$

where $|W_{Y-D}|_{max}$ is the limit energy difference of the 12-pulse inverter, E is the RMS value of the AC bus voltage on the inverter side, ω is the angular frequency of HVDC transmission system, $L_c$ is the equivalent commutation inductance of the inverter, α is the firing angle, $\gamma_{min}$ is the minimum extinguishing angle and f is the frequency of HVDC transmission system.

The second processor of energy difference calculation configured to calculate the real-time energy difference and the limit energy difference of 12-pulse inverter, provides a basis and support for judging whether the commutation failure will happen when the states of the derivatives of the three-phase valve side current are not the same. This commutation failure prediction device provides a quick and simple way to predict the commutation failure, solves the problems of existing methods which need complex phasor calculations. The commutation failure prediction device reduces the complexity of calculation and improves the efficiency of calculation, and improve the quickness to protect the system.

Preferably, the third processor of commutation failure prediction is configured to perform the following steps:

judging the states of derivatives of the three-phase valve-side current are the same or not, if the states are same, the third processor of commutation failure prediction is configured to predict the commutation failure will happen; if not, the third processor of commutation failure prediction is configured to calculate the energy difference $W_{cri.}$ between the real-time energy difference and the limit energy difference of the 12-pulse inverter; if $W_{cri.}<0$, the third processor of commutation failure prediction is configured to predict the commutation failure will happen; if $W_{cri.}>0$, the third processor of commutation failure prediction is configured to predict the commutation will not happen.

Preferably, the third processor of commutation failure prediction is configured to calculate the energy difference $W_{cri.}$ by the following equation:

$$W_{cri.}=|W_{Y-D}|_{Max}-|W_{Y-D}|_\circ$$

the third processor of commutation failure prediction is configured to predict weather the commutation failure will happen by judging the states of the derivatives of the three-phase valve side current are the same or not to. If they are same, the third processor of commutation failure prediction is configured to predict the commutation failure will happen. If not, the third processor of commutation failure prediction is configured to predict weather the commutation failure will happen according to the energy accumulation features of 12-pulse wave inverter. The combination of the above two parts provides a quick and simple way to predict the commutation failure, and the accuracy of commutation prediction is improved effectively by this device.

Each of the first processor, the second processor, and the third processor is independent processor, or all of them are integrated in a single processor.

This disclosure further provides a storage medium encoded with a set of machine-executable instructions to perform a commutation failure prediction method based on energy accumulation features of inverter, the method comprising:

collecting instantaneous values of three-phase valve side current and calculating derivatives of the three-phase valve side current according to the instantaneous values of three-phase valve side current; the derivative includes three states: positive, negative and zero;

determining the locations of incoming valve and ongoing valve in the 12-pulse inverter according to the derivatives of three-phase valve side currents; calculating energy accumulation features of the 12-pulse inverter based on the valve side current of the incoming valve and ongoing valve, the energy accumulation features include real-time energy difference and limit energy difference;

predicting whether the commutation failure from the incoming valve to the ongoing valve will happen according to the states of the derivatives of the three-phase valve side current and the energy accumulation features of the 12-pulse inverter.

Those skilled in the art may understand that all or part of the process of implementing the method in the above embodiments may be completed by a computer program instructing relevant hardware, and the program may be stored in a readable computer storage medium. Wherein, the readable computer storage medium can be a magnetic disk, a light disk, a read-only storage memory or a random storage memory, etc.

The above mentioned is only the better specific implementation mode of the disclosure, but the protection scope of the disclosure is not limited to this. Any person skilled in the art can easily think of changes or replacements within the scope of the technology disclosed by the disclosure shall be covered within the protection scope of the disclosure.

The foregoing descriptions of specific exemplary embodiments of the present disclosure have been presented for purposes of illustration and description. They are not intended to be exhaustive or to limit the disclosure to the precise forms disclosed, and obviously many modifications and variations are possible in light of the above teachings. The exemplary embodiments were chosen and described in order to explain certain principles of the disclosure and their practical disclosure, to thereby enable those skilled in the art to make and utilize various exemplary embodiments of the present disclosure, as well as various alternatives and modifications thereof. It is intended that the scope of the disclosure be defined by the Claims appended hereto and their equivalents.

What is claimed is:

1. A commutation failure prediction method based on energy accumulation features of inverter, wherein the inverter is a 12-pulse inverter; the method comprising:
    collecting instantaneous values of three-phase valve side current and calculating derivatives of the three-phase valve side current according to the instantaneous values of three-phase valve side current, the derivative includes three states: positive, negative and zero;
    determining locations of incoming valve and ongoing valve in the 12-pulse inverter according to the derivatives of the three-phase valve side current; calculating energy accumulation features of the 12-pulse inverter based on the valve side current of the incoming valve and ongoing valve, the energy accumulation features include real-time energy difference and limit energy difference;
    predicting whether the commutation failure from the incoming valve to the ongoing valve will happen according to the states of the derivatives of the three-phase valve side current and the energy accumulation features of the 12-pulse inverters.

2. The commutation failure prediction method according to claim 1, wherein, the equation of the real-time energy difference of the 12-pulse inverter is:

$$|W_{Y\text{-}D}| = L_c i_1 i_2$$

where $|W_{Y\text{-}D}|$ is the real-time energy difference of the 12-pulse inverter, $L_c$ is the equivalent commutation inductance of the inverter, i1 is valve-side current of the incoming valve and i2 is valve-side current of the ongoing valve.

3. The commutation failure prediction method according to claim 1, wherein, the equation of the limit energy difference of the 12-pulse inverter is:

$$|W_{Y\text{-}D}|_{Max} = \frac{E^2}{8\omega^2 L_c}(\cos\alpha + \cos\gamma_{min})^2$$

$$\omega = 2\pi f$$

where $|W_{Y\text{-}D}|_{max}$ is the limit energy difference of the 12-pulse inverter, E is the RMS value of the AC bus voltage on the inverter side, $\omega$ is the angular frequency of HVDC transmission system, $L_c$ is the equivalent commutation inductance of the inverter, $\alpha$ is the firing angle, $\gamma_{min}$ is the minimum extinguishing angle and f is the frequency of HVDC transmission system.

4. The commutation failure prediction method according to claim 1, wherein, predicting whether the commutation failure from the incoming valve to the ongoing valve will happen according to the states of the derivatives of the three-phase valve side current and the energy accumulation features of the 12-pulse inverter, comprises:
    judging the states of the derivatives of the three-phase valve side current are the same or not, if the states are same, predicting the commutation failure will happen, if not, calculating the energy difference $W_{cri.}$ between the real-time energy difference and the limit energy difference of the 12-pulse inverter;
    if $W_{cri.}<0$, predicting the commutation failure will happen; if $W_{cri.}>0$ predicting the commutation failure will not happen.

5. The commutation failure prediction method according to claim 2, wherein, predicting whether the commutation failure from the incoming valve to the ongoing valve will happen according to the states of the derivatives of the three-phase valve side current and the energy accumulation features of the 12-pulse inverter, comprises:
    judging the states of the derivatives of the three-phase valve side current are the same or not, if the states are same, predicting the commutation failure will happen, if not, calculating the energy difference $W_{cri.}$ between the real-time energy difference and the limit energy difference of the 12-pulse inverter;
    if $W_{cri.}<0$, predicting the commutation failure will happen; if $W_{cri.}>0$, predicting the commutation failure will not happen.

6. The commutation failure prediction method according to claim 3, wherein, predicting whether the commutation failure from the incoming valve to the ongoing valve will happen according to the states of the derivatives of the three-phase valve side current and the energy accumulation features of the 12-pulse inverter, comprises:
    judging the states of the derivatives of the three-phase valve side current are the same or not, if the states are same, predicting the commutation failure will happen, if not, calculating the energy difference $W_{cri.}$ between the real-time energy difference and the limit energy difference of the 12-pulse inverter;
    if $W_{cri.}<0$, predicting the commutation failure will happen; if $W_{cri.}>0$, predicting the commutation failure will not happen.

7. The commutation failure prediction method according to claim 4, wherein, the equation of the $W_{cri.}$ is:

$$W_{cri.} = |W_{Y\text{-}D}|_{Max} - |W_{Y\text{-}D}|.$$

8. The commutation failure prediction method according to claim 5, wherein, the equation of the $W_{cri.}$ is:

$$W_{cri.} = |W_{Y\text{-}D}|_{Max} - |W_{Y\text{-}D}|.$$

9. The commutation failure prediction method according to claim 6, wherein, the equation of the $W_{cri.}$ is:

$$W_{cri.} = |W_{Y\text{-}D}|_{Max} - |W_{Y\text{-}D}|.$$

10. A commutation failure prediction device based on energy accumulation features of inverter, wherein, the device comprising:
    a first processor of data acquisition, configured to collect instantaneous values of three-phase valve side current and calculate derivatives of the three-phase valve side current according to the instantaneous values of three-phase valve side current, the derivative includes three states: positive, negative and zero;

a second processor of energy difference calculation, configured to determining locations of incoming valve and ongoing valve in the 12-pulse inverter according to the derivatives of the three-phase valve side current; based on the valve side current of the incoming valve and the ongoing valve, and calculate energy accumulation features of the 12-pulse inverter; the energy accumulation features include real-time energy difference and limit energy difference;

a third processor of commutation failure prediction, configured to predict whether the commutation failure from the incoming valve to the ongoing will happen according to the states of the derivatives of the three-phase valve side current and the energy accumulation features of the 12-pulse inverter.

11. The commutation failure prediction device according to claim 10, wherein, the second processor of energy difference calculation is configured to calculate the real-time energy difference of 12-pulse inverter by the following equation:

$$|W_{Y-D}| = L_c i_1 i_2$$

where $|W_{Y-D}|$ is the real-time energy difference of the 12-pulse inverter, $L_c$ is the equivalent commutation inductance of the inverter, i1 is valve-side current of the incoming valve and i2 is valve-side current of the ongoing valve.

12. The commutation failure prediction device according to claim 10, wherein, the second processor of energy difference calculation is configured to calculate the limit energy difference by the following equation:

$$|W_{Y-D}|_{Max} = \frac{E^2}{8\omega^2 L_c}(\cos\alpha + \cos\gamma_{min})^2$$

$$\omega = 2\pi f$$

where $|W_{Y-D}|_{max}$ s the limit energy difference of the 12 valve inverter, E is the RMS value of the AC bus voltage on the inverter side, ω is the angular frequency of HVDC transmission system, $L_c$ is the equivalent commutation inductance of the inverter, α is the firing angle, $\gamma_{min}$ is the minimum extinguishing angle and f is the frequency of HVDC transmission system.

13. The commutation failure prediction device according to claim 12, wherein, the third processor of commutation failure prediction is configured to perform the following process:

judging the states of the derivatives of the three-phase valve side current are the same or not, if the states are same, the third processor of commutation failure prediction is configured to predict the commutation failure will happen; if not, the third processor of commutation failure prediction is configured to calculate the energy difference $W_{cri.}$ between the real-time energy difference and the limit energy difference of the 12-pulse inverter;

if $W_{cri.}$<0, the third processor of commutation failure prediction is configured to predict the commutation failure will happen; if $W_{cri.}$>0, the third processor of commutation failure prediction is configured to predict the commutation failure will not happen.

14. The commutation failure prediction device according to claim 13, wherein, the third processor of commutation failure prediction is configured to calculate the energy difference $W_{cri.}$ by the following equation:

$$W_{cri.} = |W_{Y-D}|_{Max} - |W_{Y-D}|.$$

15. A storage medium encoded with a set of machine-executable instructions to perform a commutation failure prediction method based on energy accumulation features of inverter, wherein, the method comprising:

collecting instantaneous values of three-phase valve side current and calculating derivatives of the three-phase valve side current according to the instantaneous values of three-phase valve side current; the derivative includes three states: positive, negative and zero;

determining the locations of incoming valve and ongoing valve in the 12-pulse inverter according to the derivatives of three-phase valve side currents; calculating energy accumulation features of the 12-pulse inverter based on the valve side current of the incoming valve and ongoing valve, the energy accumulation features include real-time energy difference and limit energy difference;

predicting whether the commutation failure from the incoming valve to the ongoing valve will happen according to the states of the derivatives of the three-phase valve side current and the energy accumulation features of the 12-pulse inverter.

* * * * *